(12) United States Patent
Miller

(10) Patent No.: US 8,695,272 B2
(45) Date of Patent: Apr. 15, 2014

(54) WEED RESISTANT FISHING WEIGHT AND METHOD

(76) Inventor: Danny Miller, Orangevale, CA (US)

(*) Notice: Subject to any disclaimer, the term of this patent is extended or adjusted under 35 U.S.C. 154(b) by 349 days.

(21) Appl. No.: 12/869,730

(22) Filed: Aug. 26, 2010

(65) Prior Publication Data
US 2011/0047857 A1  Mar. 3, 2011

Related U.S. Application Data

(60) Provisional application No. 61/237,674, filed on Aug. 27, 2009.

(51) Int. Cl.
*A01K 95/00* (2006.01)
*A01K 85/02* (2006.01)

(52) U.S. Cl.
USPC ........... 43/44.9; 43/43.1; 43/42.39; 43/42.36; 43/42.41; 43/42.05

(58) Field of Classification Search
USPC .............. 43/44.9, 44.91, 44.87, 43.1, 42.39, 43/42.36, 41, 41.2, 42.4, 42.41, 42.05, 43/42.08
See application file for complete search history.

(56) References Cited

U.S. PATENT DOCUMENTS

| | | | | |
|---|---|---|---|---|
| 1,178,861 A * | 4/1916 | Kruschke | | 43/42.4 |
| 1,182,822 A * | 5/1916 | Volk | | 43/44.97 |
| 1,193,912 A * | 8/1916 | Maire et al. | | 43/44.9 |
| 1,390,458 A * | 9/1921 | Moree | | 43/42.05 |
| 1,434,204 A * | 10/1922 | Grounsell | | 43/42.05 |
| 1,515,849 A * | 11/1924 | Eppinger | | 43/42.4 |
| 1,768,033 A * | 6/1930 | Deatz | | 43/42.4 |
| 1,801,940 A * | 4/1931 | Stanley | | 43/42.39 |
| 1,833,241 A * | 11/1931 | Wright | | 43/42.48 |
| 1,848,600 A * | 3/1932 | Best | | 43/43.1 |
| 1,972,697 A * | 9/1934 | Walsh | | 43/42.05 |
| 1,993,798 A * | 3/1935 | Peterson | | 43/42.39 |
| 2,036,954 A * | 4/1936 | Murray | | 43/42.08 |
| 2,054,407 A * | 9/1936 | Campbell | | 43/42.05 |
| 2,112,901 A * | 4/1938 | Anderson | | 43/42.05 |
| 2,181,254 A * | 11/1939 | Wilson | | 43/42.05 |
| 2,225,676 A * | 12/1940 | White | | 43/42.05 |
| 2,292,743 A * | 8/1942 | Cordry | | 43/41.2 |
| 2,373,417 A * | 4/1945 | Rosegard | | 43/42.05 |
| 2,481,707 A * | 9/1949 | Young | | 43/43.13 |
| 2,522,191 A * | 9/1950 | Pillow | | 43/44.96 |
| 2,523,949 A * | 9/1950 | Gambill | | 43/42.36 |

(Continued)

FOREIGN PATENT DOCUMENTS

| | | | | |
|---|---|---|---|---|
| GB | 2187922 A * | 9/1987 | | A01K 95/00 |
| GB | 2411809 A * | 9/2005 | | A01K 95/00 |

(Continued)

*Primary Examiner* — Darren W Ark
(74) *Attorney, Agent, or Firm* — Law Offices of David M. Lang; David M. Lang

(57) ABSTRACT

A weight to facilitate weed resistant fishing is disclosed. Embodiments include a biconically-tapered weight shaped to define a relatively centrally located aperture, an off-center exit aperture, surrounded by a lip, wherein the weight has a channel where conventional fishing line may pass through the top of the weight, through the channel, and out an exit aperture. With tension on the line, a portion of the hook enters the lip and the hook is relatively shielded from accumulating weeds on decent through a weed mass. A variety of methods disclose manipulating a conventional fishing rod and line with the subject weight.

6 Claims, 3 Drawing Sheets

(56) References Cited

U.S. PATENT DOCUMENTS

| | | | | |
|---|---|---|---|---|
| 2,568,488 A * | 9/1951 | Cummins | | 43/42.39 |
| 2,599,973 A * | 6/1952 | Bujaky | | 43/44.91 |
| 2,605,577 A * | 8/1952 | Waugler | | 43/42.39 |
| 2,607,152 A * | 8/1952 | Zygmunt Kubiak et al. | | 43/41.2 |
| 2,663,965 A * | 12/1953 | Rosen | | 43/42.39 |
| 2,712,197 A * | 7/1955 | Lewis | | 43/41.2 |
| 2,734,301 A * | 2/1956 | Fuqua | | 43/42.05 |
| 2,775,840 A * | 1/1957 | Dumas | | 43/42.05 |
| 2,788,605 A * | 4/1957 | Rediess et al. | | 43/43.1 |
| 2,831,288 A * | 4/1958 | Killebrew | | 43/44.97 |
| 2,892,281 A * | 6/1959 | Schilling et al. | | 43/42.36 |
| 2,986,838 A * | 6/1961 | Smyser | | 43/42.36 |
| 3,010,243 A * | 11/1961 | Dickinson | | 43/42.05 |
| 3,068,604 A * | 12/1962 | Nyberg | | 43/42.05 |
| 3,077,049 A * | 2/1963 | Ward | | 43/44.9 |
| 3,388,495 A * | 6/1968 | Minser | | 43/42.05 |
| 3,426,467 A * | 2/1969 | Bryant | | 43/42.05 |
| 3,453,768 A * | 7/1969 | Feaster et al. | | 43/42.39 |
| 3,535,813 A * | 10/1970 | Cordell, Jr. | | 43/42.05 |
| 3,631,624 A * | 1/1972 | Edde | | 43/42.05 |
| 3,722,128 A * | 3/1973 | Tremblay | | 43/42.4 |
| 3,768,194 A * | 10/1973 | Murray | | 43/42.4 |
| 3,908,298 A * | 9/1975 | Strader | | 43/42.39 |
| 3,914,895 A * | 10/1975 | Mize | | 43/42.05 |
| 3,940,871 A * | 3/1976 | Evans | | 43/44.97 |
| 3,947,990 A * | 4/1976 | Johnson | | 43/44.9 |
| 4,060,925 A * | 12/1977 | Bias | | 43/41.2 |
| 4,222,194 A * | 9/1980 | Thorvaldsen | | 43/41.2 |
| 4,528,771 A * | 7/1985 | Rea, Jr. | | 43/44.9 |
| 4,534,127 A * | 8/1985 | Thorvaldsen | | 43/41.2 |
| 4,610,104 A * | 9/1986 | Garcia | | 43/41.2 |
| 4,615,136 A * | 10/1986 | Bank | | 43/44.91 |
| 4,672,766 A * | 6/1987 | Mattison | | 43/42.36 |
| 4,785,572 A * | 11/1988 | Crumley | | 43/44.9 |
| 4,796,375 A * | 1/1989 | Wilson | | 43/42.05 |
| 4,803,798 A * | 2/1989 | Hannah | | 43/44.91 |
| 4,837,966 A * | 6/1989 | Bethel | | 43/44.9 |
| 4,914,851 A * | 4/1990 | Acker | | 43/42.41 |
| 5,031,351 A * | 7/1991 | Rogel | | 43/44.9 |
| 5,040,325 A * | 8/1991 | Herrmann | | 43/42.36 |
| 5,233,785 A * | 8/1993 | Ching | | 43/42.05 |
| 5,305,543 A * | 4/1994 | Fore | | 43/44.9 |
| 5,319,876 A * | 6/1994 | Vlahek | | 43/44.9 |
| 5,351,434 A * | 10/1994 | Krenn | | 43/44.91 |
| 5,367,817 A * | 11/1994 | Clark | | 43/42.36 |
| 5,491,927 A * | 2/1996 | Ortiz | | 43/42.39 |
| 5,918,408 A * | 7/1999 | Laney | | 43/44.9 |
| 5,960,579 A * | 10/1999 | Hampton | | 43/41.2 |
| 6,073,386 A * | 6/2000 | Firmin | | 43/44.9 |
| 6,105,303 A * | 8/2000 | Hall, Sr. | | 43/42.08 |
| 6,170,191 B1 * | 1/2001 | Laney | | 43/44.9 |
| 6,272,786 B1 * | 8/2001 | Braden | | 43/42.41 |
| 6,519,894 B1 * | 2/2003 | Geary | | 43/41.2 |
| 6,691,450 B2 * | 2/2004 | Glavinich | | 43/43.1 |
| 7,234,266 B2 * | 6/2007 | Thomas | | 43/42.08 |
| 7,234,267 B1 * | 6/2007 | Konstant | | 43/42.36 |
| 7,841,128 B1 * | 11/2010 | Zimmer et al. | | 43/44.9 |
| 8,316,576 B1 * | 11/2012 | Brown | | 43/42.39 |
| 2002/0174592 A1 * | 11/2002 | Wright | | 43/42.36 |
| 2004/0107628 A1 * | 6/2004 | Mueller | | 43/42.39 |
| 2004/0134119 A1 * | 7/2004 | Glavinich et al. | | 43/44.87 |
| 2004/0134120 A1 * | 7/2004 | Long | | 43/44.87 |
| 2004/0154212 A1 * | 8/2004 | Harrell | | 43/42.39 |
| 2004/0216359 A1 * | 11/2004 | Mitchell | | 43/42.36 |
| 2005/0183323 A1 * | 8/2005 | Harrell | | 43/42.39 |
| 2007/0033857 A1 * | 2/2007 | Myers | | 43/44.9 |
| 2007/0294934 A1 * | 12/2007 | Myers | | 43/44.9 |
| 2008/0127542 A1 * | 6/2008 | Young | | 43/42.36 |
| 2008/0148623 A1 * | 6/2008 | Uhrig | | 43/42.39 |
| 2008/0250693 A1 * | 10/2008 | Krueger | | 43/42.39 |
| 2009/0100740 A1 * | 4/2009 | Chan | | 43/42.36 |
| 2011/0131863 A1 * | 6/2011 | Parcell | | 43/41 |
| 2012/0023804 A1 * | 2/2012 | Hogan | | 43/42.39 |

FOREIGN PATENT DOCUMENTS

| | | | | | |
|---|---|---|---|---|---|
| JP | 11235141 A | * | 8/1999 | | A01K 95/00 |
| JP | 2001275535 A | * | 10/2001 | | A01K 95/00 |
| JP | 2004081082 A | * | 3/2004 | | A01K 95/00 |
| JP | 2006020504 A | * | 1/2006 | | A01K 95/00 |
| JP | 2006325468 A | * | 12/2006 | | A01K 95/00 |
| JP | 2006340706 A | * | 12/2006 | | A01K 95/00 |
| JP | 2007006766 A | * | 1/2007 | | A01K 95/00 |
| JP | 2007252263 A | * | 10/2007 | | A01K 95/00 |
| JP | 2009095317 A | * | 5/2009 | | A01K 95/00 |
| JP | 2010017169 A | * | 1/2010 | | A01K 95/00 |
| WO | WO 2005060742 A1 | * | 7/2005 | | A01K 95/00 |

* cited by examiner

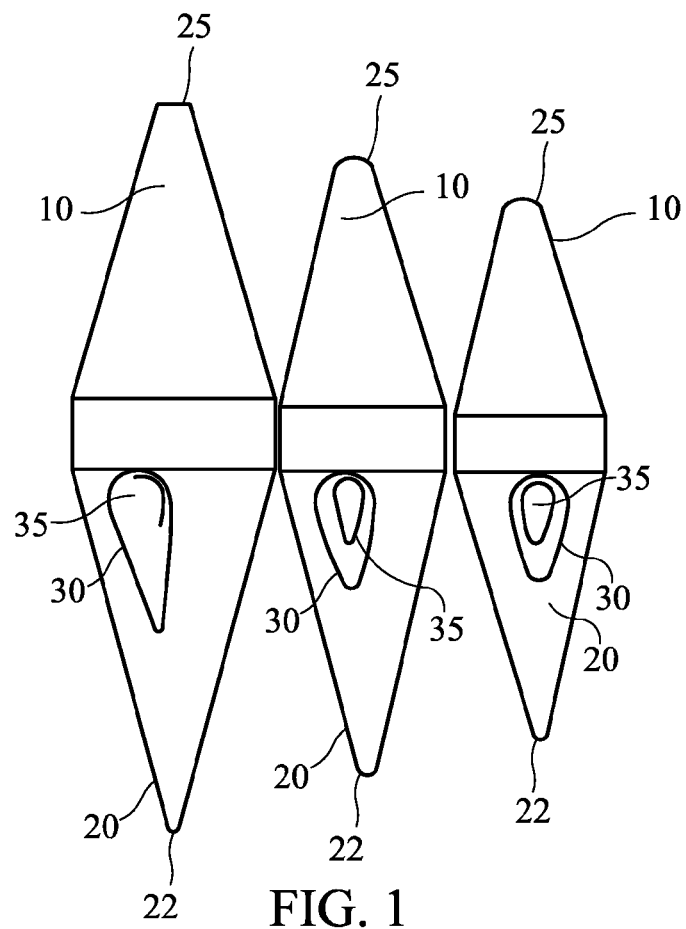
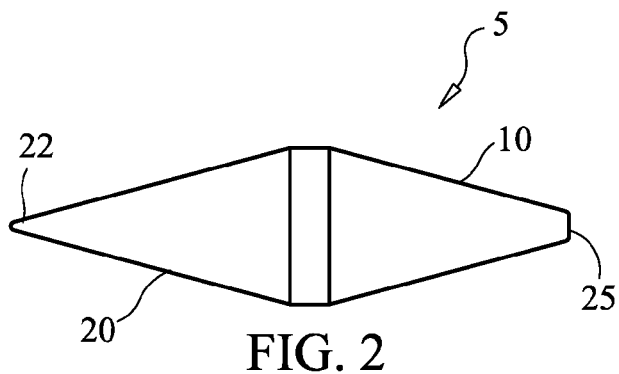
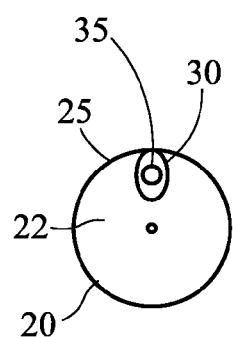
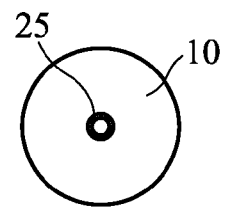

WEED RESISTANT FISHING WEIGHT AND METHOD

CROSS REFERENCE TO RELATED APPLICATIONS

The application claims 35 U.S.C. §119(e), to U.S. Provisional Application 61/237,674 filed Aug. 27, 2009, entitled "WEED RESISTANT FISHING WEIGHT AND METHOD" which is incorporated by reference into this application as if fully set forth herein.

FIELD OF THE INVENTION

The present invention is related to fishing apparatus and tackle generally, and more specifically to fishing weight utilization and weed resistant tackle.

BACKGROUND

The need for weight on a fishing line is common. Weight aids in line casting and permits bait or lure placement at a specific position relative to the bottom surface of a body of water. Aquatic vegetation takes many forms including weeds—and it is hard to find an experienced fisherman who has not encountered problematic weeds. Weeds result in hook snaring, loss of bait, broken line, and improper bait/line placement. Weights frequently compound the problem of collecting weeds wherein a weighted line passes through a mat of weeds and the weight itself serves as a weed collection point. What is needed is a weight that minimizes weed collection. Often, a thick mat of surface cover will exist over prime fishing waters, and presenting the lure or bait through a thick mat of reeds of weeds is a challenge.

One way to penetrate dense surface cover is to cast a line bearing a conventional weight relatively high into the air to provide the necessary acceleration/force to penetrate the dense surface weed cover. This is problematic because the technique commonly causes excessive surface water disturbance as the weight aggressively enters the water. This has the undesirable consequence spooking fish and disrupting fishing conditions.

SUMMARY

The present invention discloses a weight which aids in penetrating weeds without gathering them. In one embodiment, the present invention discloses a weight that is conical on one or both ends, wherein the tip of the weight penetrates a weed mat without becoming ensnared. In one embodiment, the present invention discloses a bi-conical weight with a centrally disposed aperture at a first apex through which a fishing line passes, wherein the line exits through the weight's side. The weight may terminate in a second apex. The present also discloses a method of manipulating the inventive apparatus to delicately penetrate surface cover. This allows the angler to present the weight and bait surreptitiously—in a stealthy and refined manner.

BRIEF DESCRIPTION OF THE DRAWINGS

FIG. 1 is a perspective view of a series of embodiment weights.

FIG. 2 is a elevation view of a bi-conical embodiment weight.

FIG. 3 is a bottom view of an embodiment weight illustrating an exit aperture.

FIG. 4 is a top view of an embodiment weight illustrating a central entrance aperture.

DETAILED DESCRIPTION

Figure 5:
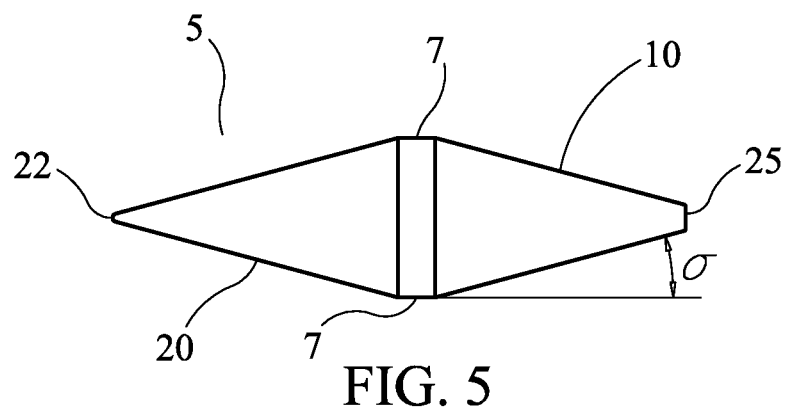
FIG. 5 is a perspective view of an embodiment weight.

In one embodiment, as illustrated by a series of different sized weights depicted by FIG. 1. apparatus weight 5 having a long axis and short axis, has a first end 10, and second end 20, wherein the first end 10 and second end 20 taper. In one embodiment apparatus 5 may be biconically shaped and second end 20 may terminate in point 22. The weight has an outer surface which, in certain embodiments, may be coated to minimize friction between the weight's 5 outer surface and a weed mass and/or promote laminar flow of water over weight 5.

Aperture 25 is relatively centrally located in the proximal aspect of first end 10 and defines the entrance to channel 27a which has an inner surface and passes through weight 5 exiting at exit aperture 35, which in one embodiment may be off-center. Exit aperture 35 is surrounded by lip 30.

Figure 6:
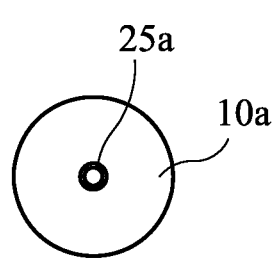
FIG. 6 is a top view of an embodiment weight illustrating a central entrance aperture.
Figure 7:
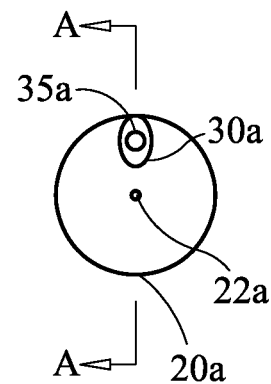
FIG. 7 is a bottom view of an embodiment weight illustrating an exit aperture of non-limiting specific embodiment dimensions.
Figure 8:
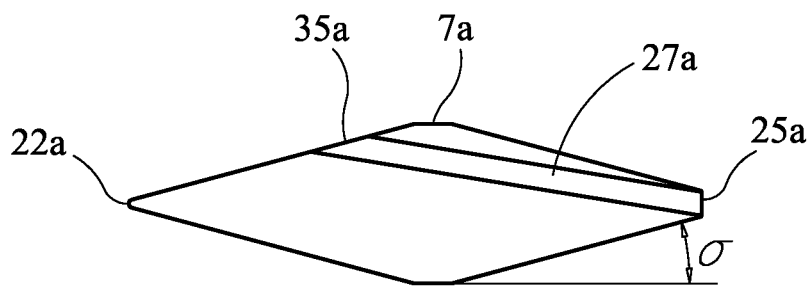
FIG. 8 is a sectional view taken through line A-A of FIG. 7 illustrating an weight depicting embodiment tapering and embodiment channel.

In one specific non-limiting example embodiment found to be useful, as illustrated by FIGS. 6-8, apparatus 5 is tapered to a specified degree a inwardly relative to widest portion 7. In one embodiment σ equals 10 degrees inwardly as measured from the widest point of apparatus 5a to the point 22a or 25a at one or both ends. Importantly, in an alternative embodiment, second end 20 may be tapered while first end 10 is non-tapered or tapered to a different degree—and vice versa. FIG. 7 illustrates an embodiment second end 20a terminating in point 22a. Lip 30a, in one embodiment only, is pitched at 20 degrees and surrounds aperture 35a, which in a preferred embodiment is 0.0425 inches. Lip 30a slants inwardly and becomes progressively deeper toward aperture 35a. FIG. 6 illustrates central entrance aperture 25a, the mouth of which may be the same size or slightly larger than channel 27a passing through the center of weight 5a as illustrated by FIG. 8. Importantly, it should be noted that a channel, such as channel 27a may be present in all embodiments described herein.

In one embodiment, channel 27a may be coated with a material having a coefficient of static and kinetic friction between the fishing line and weight that is less than the surface of weight 5 itself. For example, silicone, plastic, or Teflon, may be used. In one embodiment, a tubular insert may be disposed within the channel—the insert having a cross-sectional diameter sufficient to permit fishing line to pass within. In one example, a low friction tubular insert may be disposed within channel 27 and comprised of nylon or plastic. The use of such is particularly useful where fishing with relatively thin, low pound-test line is desired. The addition of a low friction insert permits more movement of the weight and line relative to each other and prevents potentially catastrophic line fraying and wear.

Figure 9:
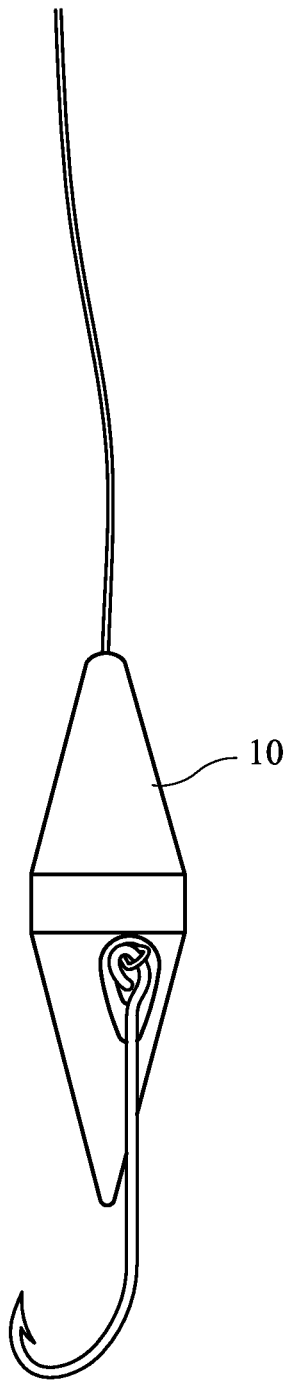
FIG. 9 is a perspective view showing the apparatus in use with an example conventional hook and line.
Figure 10:
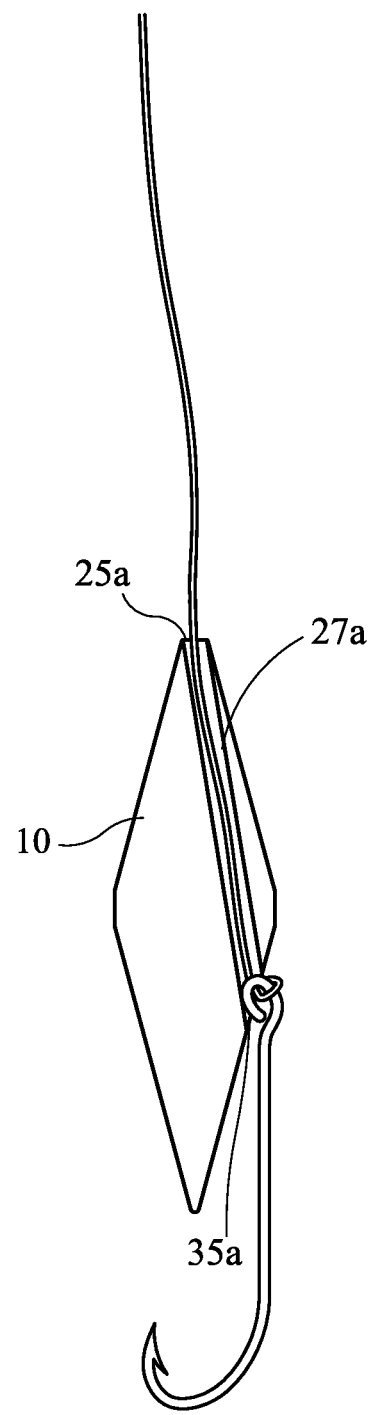
FIG. 10 is a sectional view taken through line A-A of FIG. 7.

In use, a fishing line and rod is provided. The rod has at least one line guide for maintaining control of the line on the rod. An apparatus as described above is provided and disposed on the line between the line guide and the line's end which is attached to a conventional hook which has an eye and a barb or lure. Fishing line is passed through aperture 25, then through channel 27a in the weight and exits through aperture 35 such that the line and weight 5 are movable relative to each other. Weight 5 rests on the hook bearing the object to be fished. The line bearing the hook and weight 5 is cast and the rod tip raised. The rod and line are then manipulated to minimize weed accumulation on the hook/lure. In one method, as the rod is raised, relative tension in the line orientates the long axis of weight 5 perpendicular to the water surface. Tapered second end 20 penetrates weed beds, grass, hyacinth, hydrilla, lilly pads, dead or live tule mats, delta cheese, or other top or subsurface aquatic vegetation. As illustrated by FIGS. 9 and 10, the eye of a conventional hook enters aperture 35a and is thereby relatively shielded by resting in lip 30 from accumulating weeds on descent through a weed mass. As weight 5 makes contact with the bottom surface the hook or lure is disengaged from aperture 35a and lip 30 and may be fished with sufficient and variable distance between the hook and weight 5. In an alternative method, the user can provide more distance between weight 5 and the hook by feeding line as weight 5 is falling. In this method of utilization, the relatively wide falling weight 5 will clear a path for the trailing hook or lure to prevent weed ensnarement.

Regarding composition, weight 5 in certain embodiments may be constructed of any metal including brass, copper, steel, titanium, aluminum, and other metals. In a preferred embodiment, the external surface of apparatus 5 may be colored flat green through known methods, such as by powder coating. The dull color mimics tule and minimizes the chance that a target fish will be frightened by unfamiliar appearing materials. The size of apparatus 5 is determined by the variables such as anticipated weed type, weed density, the lure or hook used, and rate of desired descent. Non-limiting useful examples weights have been 0.75 ounce, 1.0 ounce, 1.5 ounce, and 2.0 ounce weight embodiments.

On retrieval, the line is retrieved through the weight until the eye of the hook enters aperture 35 and the barb is within lip 30—relatively recessed. As the line is retrieved, the barb is relatively shielded from accumulating weeds, and the tapered nature of first end 10 substantially minimizes weed collection.

The present invention also discloses a variety of methods of fishing weight 5 by providing a weight 5 that has a tapered first end 10 and tapered second end 20 wherein a central aperture 25 in first end, and exit aperture 35 recessed within a lip 30 in the second end, wherein line may be threaded through said central aperture 25, through a channel within said weight, and exit through the exit aperture 35. The user next attaches a suitable hook or lure to the line's terminal end.

In a first preferred embodiment, an angler imparts a relatively small amount of force to the rod's tip sufficient to gently "flick" or "tug" weight 5 to free a lure and weight caught in vegetation. Further, this flicking or tugging action permits weight 5 to be moved gently along the surface weeds until one of the manipulations orients weight 5 perpendicular to the weed cover such that point 22 of tapered second end 20, or the narrowest portion of first end 10 penetrate the weed mat and clear a path for the trailing hook and/or lure. Of course, it is possible that apparatus 5 may penetrate surface weed cover in some circumstances where the manipulation results in weight 5 being oriented in a less than a precisely perpendicularly; whether or not weight 5 will penetrate a given weed cover depends on a host of factors including the type of weed cover, weed density, mass of weight 5 selected, as well as characteristics of the lure/hook/bait such as buoyancy and resistance.

In a second method, weight 5, line, and rod are assembled as described above, and the angler places continuous tension on the line to engage the eye of the hook or lure with exit aperture 35 of said weight such that the recess and tapered nature of the weight's second end 20 minimize weed accumulation on the weight or hook/lure. The user next casts or drops the weighted line into the water to be fished, and by placing continuous tension on the line (e.g. by raising the tip of a fishing rod or engaging the reel) the line will orient weight 5 such the long axis is perpendicular to the water surface. The weight descends through the water and may penetrate weed beds and other aquatic vegetation while minimizing the collection of plant material. Next, the user allows the hook/lure to disengage from the weight so that the bait/hook/lure may be presented away from weight 5. This may be accomplished by relaxing tension in the line to permit weight 5 to descend in the water faster than the lure/hook/bait or by permitting the weight to settle on the bottom surface of the body of water being fished whereupon current factors, buoyancy of the lure/hook/bait, or action of live bait will provide such distance. When retrieval is desired, the user retrieves the line whereupon the eye of the hook will become engaged in aperture 35. Lip 30 and the shape of the first end 10 of weight 5 minimize the hook's and weight's exposure to collecting weeds.

In a third method, the user casts the line while permitting continuous slack. Weight 5 falls freely through the water, clearing a path for the trailing hook/lure/bait. The angler feeds line, after casting and weight 5 is falling, and the distance between the hook and weight 5 is increased, wherein the relatively wide falling weight 5 clears a path for the trailing hook to prevent weed ensnarement.

In a fourth method where the hook/lure/bait is particularly susceptible to ensnaring weed material (such as a brush hog) a bobber stopper may be fastened in a position above the hook—such as six inches from the hook's eye. Where the lure becomes ensnared, a tug of the rod tip will cause weight to move in the direction of the line. As weight 5 strikes the bobber stopper, a sudden force is imparted to the lure—often suddenly dislodging it from a weed mass.

In a fifth method, weight 5 is employed as part of a conventional Carolina rig. The location of aperture 35 orients the proximal narrowest portion of first end 10 upwardly. As the rig is pulled along the bottom surface of a body of water, the upward orientation prevents weight 5 from ensnaring and becoming entrapped on obstructions such as rocks, stumps, debris, and the like.

Importantly, where the term "weedless" is used herein, it is understood that the term is generally understood to envisage minimizing troublesome weed material—not entirely eliminating the possibility that the weight or hook will be ensnared on any vegetation. Additionally, the use of the term hook, lure, and bait has been used interchangeably throughout. It should be understood that the inventive apparatus may be used with a variety of hooks, lures, and dead/live baits.

Although the present invention has been described with reference to the various described embodiments, it should be understood that various modifications and variations can be easily made by those skilled in the art without departing from the scope and spirit of the invention. Accordingly, the foregoing disclosure should be interpreted as illustrative only and is not to be interpreted in a limiting sense. It is further intended that any other embodiments of the present invention that result from any changes in application or method of use or operation, method of manufacture, shape, size, or material which are not specified within the detailed written description or illustrations contained herein yet are considered apparent or obvious to one skilled in the art are within the scope of the present invention.

What is claimed is:

1. An apparatus to facilitate weedless fishing comprising: a brass biconically-tapered weight shaped to define an outer surface, a first end and a second end, wherein said first end and second end taper, wherein said weight is shaped to define a relatively centrally located aperture in said first end; wherein said weight is shaped to define a lip, wherein said lip is pitched at 20 degrees and surrounds an off-center exit aperture on said second end, wherein said lip is slanted inwardly and becomes progressively deeper toward said off-center exit aperture, wherein said weight is shaped to define a channel having an inner surface existing within said weight between the centrally located aperture and the exit aperture, wherein said weight has a long axis and a short axis, wherein said first end and second end taper 10 degrees, wherein fishing line may be passed through said centrally located aperture and through said channel and exit through said off-center exit aperture, wherein an end of said line is attachable to a conventional hook having an eye and barb, wherein the line and weight are movable relative to each other, wherein when the line is under tension, the eye of said conventional hook enters said aperture, wherein the barb of the hook is relatively shielded from accumulating weeds.

2. The apparatus according to claim 1, further comprising a relatively low friction surface within said channel.

3. The apparatus according to claim 2, wherein said surface comprises a plastic tubular insert having a cross-sectional diameter sufficient to permit fishing line to pass within.

4. The apparatus according to claim 2, wherein said surface comprises a nylon tubular insert having a cross-sectional diameter sufficient to permit fishing line to pass within.

5. The apparatus according to claim 2, wherein at least a portion of said low friction surface comprises a material which is Teflon.

6. The apparatus according to claim 1, wherein at least a portion of said outer surface of said weight is coated in powder coat.

* * * * *